United States Patent
Festa et al.

(10) Patent No.: US 10,236,748 B2
(45) Date of Patent: Mar. 19, 2019

(54) COOLING OF AN ACTIVE PART OF AN ELECTRIC MACHINE

(71) Applicant: SIEMENS AKTIENGESELLSCHAFT, München (DE)

(72) Inventors: Marco Festa, Falkensee (DE); Matthias Centner, Berlin (DE); Ilja Sabelfeld, Berlin (DE)

(73) Assignee: Siemens Aktiengesellschaft, München (DE)

( * ) Notice: Subject to any disclaimer, the term of this patent is extended or adjusted under 35 U.S.C. 154(b) by 347 days.

(21) Appl. No.: 15/127,654

(22) PCT Filed: Mar. 12, 2015

(86) PCT No.: PCT/EP2015/055208
§ 371 (c)(1),
(2) Date: Sep. 20, 2016

(87) PCT Pub. No.: WO2015/140048
PCT Pub. Date: Sep. 24, 2015

(65) Prior Publication Data
US 2018/0175705 A1   Jun. 21, 2018

(30) Foreign Application Priority Data

Mar. 21, 2014   (EP) .................................. 14161080

(51) Int. Cl.
*H02K 1/32* (2006.01)
*H02K 9/22* (2006.01)
(Continued)

(52) U.S. Cl.
CPC ................ *H02K 9/22* (2013.01); *H02K 1/32* (2013.01); *H02K 3/24* (2013.01); *H02K 5/20* (2013.01)

(58) Field of Classification Search
CPC .. H02K 9/22; H02K 1/32; H02K 3/24; H02K 5/20
(Continued)

(56) References Cited

U.S. PATENT DOCUMENTS 1,877,904 A * 9/1932 Laffoon .................. H02K 3/24
310/63
3,621,315 A * 11/1971 Dalmo .................... H02K 3/16
310/183
(Continued)

FOREIGN PATENT DOCUMENTS

CN         1057552 A    1/1992
DE    102008044168 A1   6/2009
(Continued)

*Primary Examiner* — Thanh Lam
(74) *Attorney, Agent, or Firm* — Henry M. Feiereisen LLC

(57) ABSTRACT

An active part of an electric machine includes at least two teeth, each having a magnetically permeable material and protruding from a lateral surface of the active part in a radial direction. Each tooth has an open recess in a plane spanned by a substantially radial direction and a direction substantially along an axis of rotation. A winding groove is arranged between the two teeth substantially along an axis of rotation of the active part for receiving an electrical winding. Arranged at least partially in the open recess is a thermally conductive element having a thermally conductive material with a thermal conductivity which is greater than a thermal conductivity of the magnetically permeable material.

17 Claims, 2 Drawing Sheets

(51) Int. Cl.
*H02K 3/24* (2006.01)
*H02K 5/20* (2006.01)

(58) Field of Classification Search
USPC ............................ 310/64, 52–59, 214–215
See application file for complete search history.

(56) References Cited

U.S. PATENT DOCUMENTS

2009/0085422 A1\* 4/2009 Kusawake ............. H02K 1/148
310/216.067
2016/0204663 A1\* 7/2016 Huang ................... H02K 19/38
310/59

FOREIGN PATENT DOCUMENTS

| EP | 0632566 A1 | 1/1995 |
|----|------------|--------|
| EP | 1276205 A2 | 1/2003 |
| RU | 2141156 C1 | 11/1999 |
| SU | 924792 A1 | 4/1982 |

\* cited by examiner

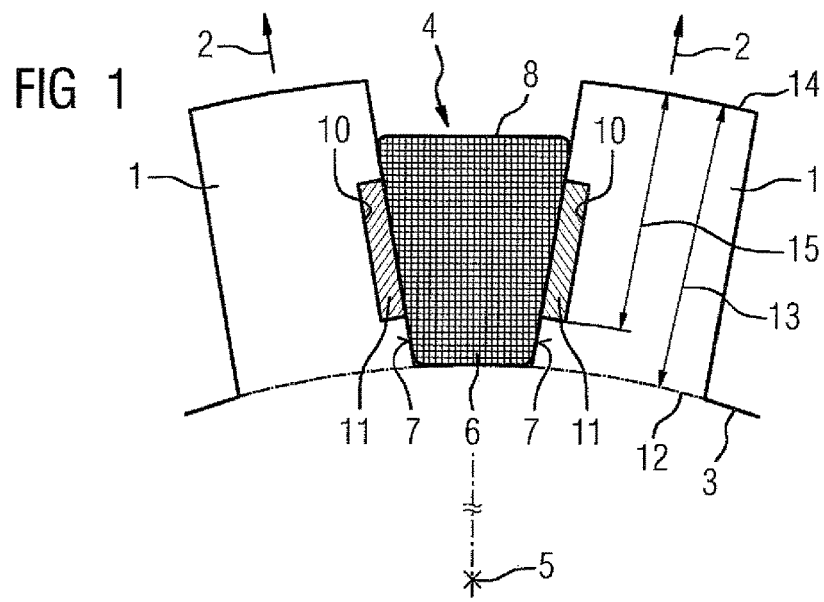
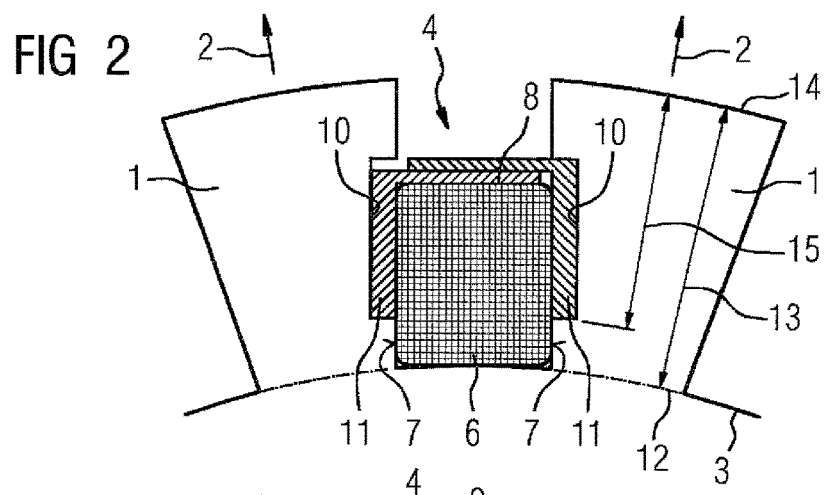
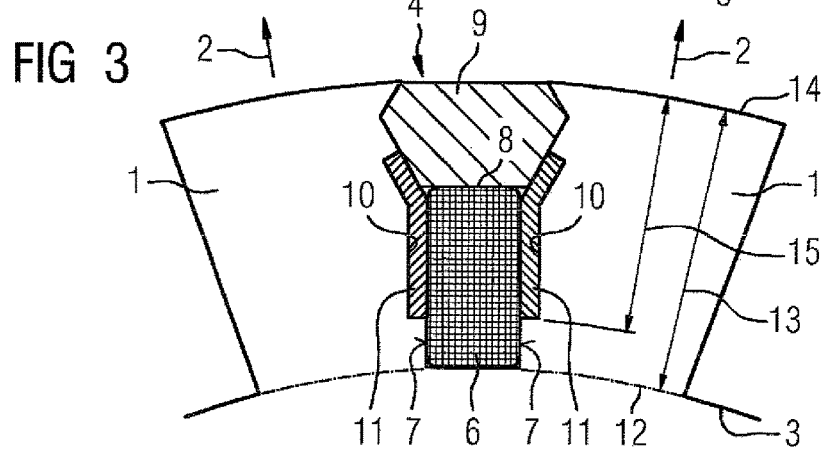

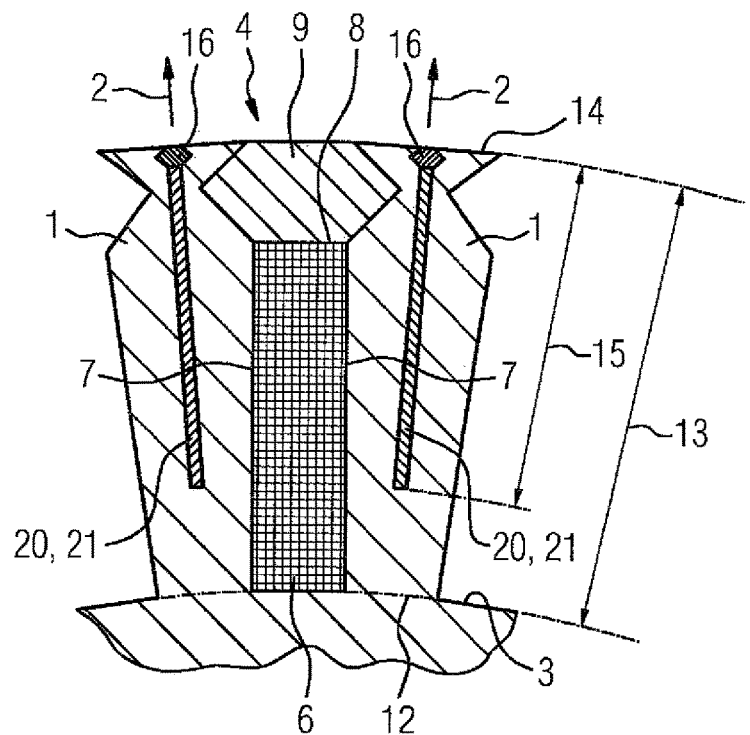
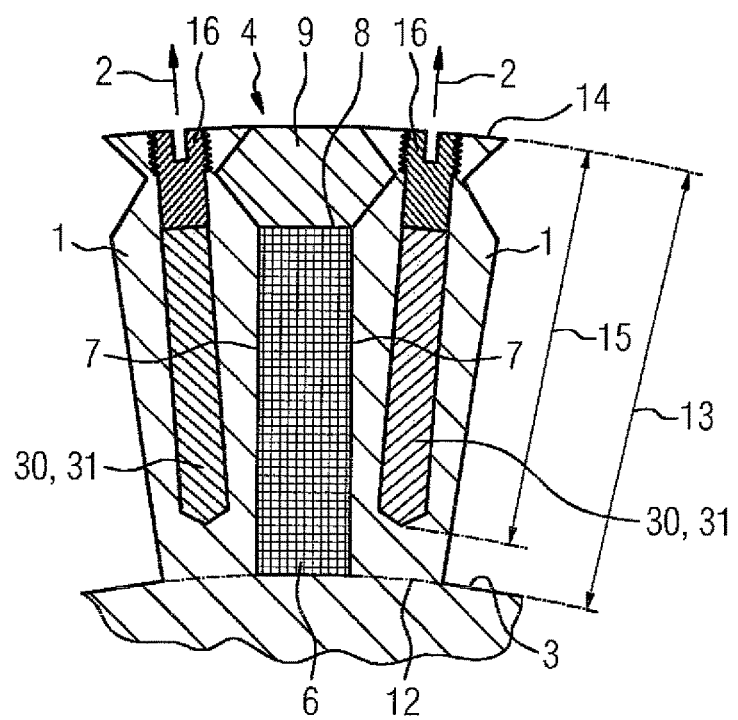

COOLING OF AN ACTIVE PART OF AN ELECTRIC MACHINE

CROSS-REFERENCES TO RELATED APPLICATIONS

This application is the U.S. National Stage of International Application No. PCT/EP2015/055208, filed Mar. 12, 2015, which designated the United States and has been published as International Publication No. WO 2015/140048 and which claims the priority of European Patent Application, Serial No. 14161080.8, filed Mar. 21, 2014, pursuant to 35 U.S.C. 119(a)-(d).

BACKGROUND OF THE INVENTION

The invention relates to an active part of an electric machine, wherein the active part comprises at least two teeth which each have a magnetically permeable material and which each protrude from a lateral surface of the active part in the radial direction and at least one winding groove which in each case is arranged between a pair of the at least two teeth, wherein the at least one winding groove is arranged substantially along an axis of rotation of the active part and wherein an electrical winding is able to be arranged in the respective winding groove. The invention further relates to an electric machine having such an active part.

Such an active part is designed, for example, as a rotor of a large electric machine. The cooling of such a rotor generally requires costly cooling systems with flow paths in the vicinity of the heat sources. In particular with non-salient pole machines, the rotor cores being designed to be solid, such as for example in turbomachines, technical and technological limitations are present in the design of the cooling channels. For these reasons, both the cooling surface and the cross-sectional surface for the cooling flows is limited. The close association between the benefit in terms of cooling technology and technical complexity is in turn reflected in high production costs.

Although cooling exclusively over the rotor surface might be associated with a considerably lower production cost, in large machines it is not possible to cool the rotor winding sufficiently. A significant proportion of the total temperature difference between the rotor winding and the cooling medium is based on the long cooling paths through the rotor teeth. The materials able to be used for the rotor core are set by mechanical and magnetic requirements.

The problem, amongst others, therefore, is that the previous solutions are either cost-intensive or insufficiently effective.

Cost-effective cooling of the rotor via the lateral surface thereof was hitherto only able to be implemented in small turbo rotors having a shaft output of less than 5 megawatts. However, then the rotor losses have to be significantly limited, i.e. only low excitation current density values are possible. Thus such cooled rotors have a large diameter or are particularly long. The temperature differences over other portions, for example over the winding insulation and from the surface to the air gap, have to be kept as small as possible by means of a suitable design.

More common is a direct ventilation of the rotor via cooling channels which extend along the machine axis and have openings to the winding elements and to the air gap. Usually a cooling surface has to be formed via the winding in the grooves which requires considerable effort during the production of the coils.

Partial laminated stacks with in each case ventilation slots located therebetween are formed only in machines where the cores in the rotor are designed as laminations. As a result, a very large cooling surface is formed and the paths between the heat sources and the cooling surface are particularly short. In rotors of solid design, this cooling variant is not used due to mechanical and technological boundary conditions.

SUMMARY OF THE INVENTION

The object of the invention is to improve the cooling of an active part in a cost-effective manner.

This object is achieved by an active part and an electric machine of the type mentioned in the introduction in that the active part comprises at least one open recess which in each case is arranged on or in one respective tooth in one respective plane, wherein the respective plane is spanned by a substantially radial direction and a direction substantially along the axis of rotation, and has at least one thermally conductive element which is arranged at least partially in the respective open recess and which has a thermally conductive material, the thermal conductivity thereof being greater than that of the magnetically permeable material.

An active part designed in such a manner permits the effective thermal conductivity of the teeth of the active part to be considerably improved, by elements made from a highly thermally conductive material being accommodated in the region of the groove sides or in the tooth itself. These elements serve for the thermal conduction in the direction of the lateral surface of the active part and, in particular, for temperature compensation along the axis of rotation.

In particular, in the proposed active part the two main functions of the active part, namely firstly the conduction of the magnetic flux and secondly the conduction of the thermal flow, are divided into two separate components in the groove region and/or tooth region.

The technical implementation of such an active part, in particular with surface-ventilated active parts, significantly contributes to the reduction in the temperature of the electrical winding located in the respective groove, so that the corresponding electric machines may be designed with a higher torque density. In this case, the proposed active part is of considerably simpler construction than the conventional design with additional flow paths, so that a reliable and at the same time cost-effective cooling of the respective active part is achieved. For example, the use of excitation coils of simple construction is permitted since a surface does not have to be produced for a convective heat transfer inside the active part.

Preferably, the active part and/or the electric machine is designed such that an operation at speeds of greater than 4000 rpm, in particular greater than 10,000 rpm and outputs of greater than 1 MW, in particular greater than 10 MW, is permitted. Preferably, the electric machine is designed as a synchronous machine and/or non-salient pole rotor machine, in particular a turbomachine. It is also conceivable that the respective tooth is designed as the respective pole of the electric machine, wherein the electric machine in this case is designed in particular as a salient pole machine.

In one advantageous embodiment of the invention the respective tooth, viewed in the peripheral direction, has one respective tooth flank which faces the respective winding groove, wherein one respective first open recess is arranged at least partially on the respective tooth flank.

The respective first open recess may be milled, for example, out of the respective tooth flank of the tooth. The aforementioned thermally conductive element is arranged in the respective first open recess. This arrangement permits a particularly effective discharge of the waste heat produced during the operation of the electric machine, since a large proportion of the waste heat is produced in the electrical winding which at least partially adjoins the respective thermally conductive element in the respective first open recess.

In particular, the respective first open recess and/or the respective thermally conductive element may extend in the axial direction along the respective complete tooth, in particular along at least half or part of the respective tooth. Since the region of the axial center generally belongs to the hottest points of the active part during operation, a relatively large axial dimension of the respective first open recess and/or the respective thermally conductive element has the additional advantage that heat from the axial center may be effectively discharged to cooler points, in particular to the axial front faces, of the active part. A relatively large axial dimension is present, for example, when the respective first open recess and/or the respective thermally conductive element extend over at least half of the axial extent of the active part. Accordingly, the respective first open recess is preferably designed as a groove and the respective thermally conductive element is preferably designed to be cuboidal, in particular as a plate.

Preferably, the respective first open recess extends in the radial direction, tapering in the peripheral direction toward the winding groove so that the respective thermally conductive element is prevented from falling out from the respective first open recess by a positive connection.

In a further advantageous embodiment of the invention, the electrical winding located in the respective winding groove in this case has a surface which faces a radial opening of the respective winding groove, wherein the at least one thermally conductive element is designed such that the at least one thermally conductive element is arranged at least partially in the radial direction adjacent to the respective surface of the respective electrical winding facing the radial opening.

Thus the respective thermally conductive element at least partially covers the electrical winding located in the respective winding groove, in the direction of the open side of the winding groove. In the example of teeth which face radially outwardly, at least one part of the respective thermally conductive element at least partially covers the radial outer surface of the respective electrical winding.

By means of a thermally conductive element designed in such a manner, it is achieved that the waste heat inside the active part is discharged in the radial direction toward the lateral surface of the active part.

In a further advantageous embodiment of the invention, the respective winding groove in this case is able to be closed in the radial direction by one respective slot wedge, the electrical winding located in the respective winding groove being able to be radially fixed thereby, wherein the respective first open recess and/or the respective thermally conductive element is at least partially arranged on a side of the respective tooth facing the respective slot wedge.

The respective first open recess and/or the respective thermally conductive element extends in the radial direction, therefore, further toward the lateral surface than the respective electrical winding, so that the thermally conductive element arranged in the respective first open recess also extends further toward the lateral surface than the respective electrical winding. This embodiment permits a particularly effective discharge of waste heat from the respective electrical winding. Such a radial extent of the respective first open recess and/or the respective thermally conductive element in this case is also conceivable without one respective slot wedge.

In a further advantageous embodiment of the invention, one respective second open recess is designed as a groove or a bore which is incorporated into the respective tooth in the radial direction.

The aforementioned thermally conductive element is arranged in the respective second recess. This arrangement permits a particularly effective discharge in the radial direction of the waste heat produced during operation of the electric machine. This is advantageous, in particular, in electric machines, losses which are not negligible also being produced in the tooth during the operation thereof which are noticeable in the form of significant heating of some regions of the respective tooth. Preferably, the respective second open recess is arranged in the peripheral direction in the region of the center of the respective tooth. The respective second open recess designed as a groove may, for example, be milled from the respective tooth.

Preferably, the respective thermally conductive element and/or the respective second open recess, along the radial region in which the respective thermally conductive element is arranged, has a dimension which increases radially outwardly in the peripheral direction.

For a further improved discharge of waste heat from the interior of the active part, in particular, at least of one of the first open recesses described further above may be combined with at least one of the aforementioned second open recesses.

In a further advantageous embodiment of the invention, the active part has in this case at least one closure stopper, the respective second open recess being able to be closed thereby.

By means of the at least one closure stopper, the respective thermally conductive element arranged in the respective second open recess is able to be reliably fixed in the radial direction. In particular, a good thermal conductor may be used as material for the respective closure stopper. It is also conceivable that the respective closure stopper also comprises the thermally conductive material.

Preferably, at least in the radial region of the respective closure stopper, the respective second open recess has a dimension in the peripheral direction which tapers in the radial direction toward the lateral surface so that the respective closure stopper is prevented from falling out from the respective second open recess by a positive connection. In particular, the respective second open recess may have upstream of its tapered portion a further widened portion of its dimension in the peripheral direction.

In a further advantageous embodiment of the invention, the active part is designed as a solid rotor of the electric machine.

In particular, the rotor and/or the electric machine is designed such that an operation at rotational speeds of greater than 4000 rpm, in particular greater than 10,000 rpm and outputs of greater than 1 MW, in particular greater than 10 MW is permitted.

Particularly in solid rotors the possibility of cooling by means of cooling channels is considerably restricted. By means of the respective open recess and the respective thermally conductive element arranged therein, however, an efficient and at the same time cost-effective cooling of such rotors is permitted.

In a further advantageous embodiment of the invention, the at least two teeth in each case protrude radially outwardly from the lateral surface, wherein at least along the electrical winding the respective tooth has a dimension in the peripheral direction which increases from radially inwardly to radially outwardly.

The respective tooth is designed, in particular, such that it has a trapezoidal cross section in a section perpendicular to the axis of rotation and its dimension in the peripheral direction increases radially outwardly. As a result, the tooth width essential for the magnetic flux also increases radially outwardly in the peripheral direction.

If only the magnetic properties of the respective tooth are considered, the tooth width increasing radially outwardly is not necessary, so that the possibility is provided to remove the magnetically permeable material of the respective tooth locally and instead to introduce the thermally conductive elements made from highly thermally conductive material. The aforementioned local removal is implemented through the aforementioned open recess and/or the first and/or the second open recess, in each case the aforementioned thermally conductive element being arranged therein.

For example, two adjacent teeth in this case are designed such that the respective winding groove located between the two adjacent teeth is designed with parallel flanks, so that the dimension in the peripheral direction of the respective winding groove does not alter from radially inwardly to radially outwardly.

Preferably, the respective tooth is designed such that the overall width remaining in the peripheral direction of the magnetically permeable material in the radial direction remains at least partially constant, in particular, along at least half or ¾ of the radial extent of the respective electrical winding. This may also be achieved, for example, by the dimension in the peripheral direction of the respective recess increasing radially outwardly.

In a further advantageous embodiment of the invention, the at least two teeth in each case protrude from one respective tooth root over a length of a tooth height to one respective tooth tip radially from the lateral surface, wherein the respective open recess and/or the respective thermally conductive element extends in the radial direction toward the respective tooth root, in each case to a depth in the respective tooth which corresponds at most to 9/10, in particular at most to 4/5 of the tooth height.

The depth is measured in this case in the radial direction from the respective tooth tip toward the respective tooth root. A respective open recess designed in such a manner and/or a respective thermally conductive element designed in such a manner represents a good compromise between satisfactory magnetic properties and a sufficient thermal discharge relative to the respective tooth. This is because for effective heat removal it is not absolutely necessary to incorporate the respective open recess and/or the respective thermally conductive element into the respective tooth in the radial direction as far as the tooth root. Thus the magnetic properties of the respective tooth at the tooth root are not disrupted and/or disrupted to an insignificant degree by the respective open recess and/or the respective thermally conductive element, which provides great advantages since the guidance and/or the density of the magnetic field lines on the tooth root may be significant for the efficiency and further important properties of the electric machine. Additionally, a respective open recess designed in such a manner has advantages for the mechanical stability of the respective tooth.

Preferably, the respective open recess and the respective thermally conductive element in this case have approximately the same radial dimension toward the respective tooth root.

In the example of teeth protruding radially outwardly from the lateral surface, it may be achieved by one respective open recess designed in such a manner and/or one respective thermally conductive element designed in such a manner that the tooth width, which the respective tooth has in the peripheral direction in the region of the tooth root, is not reduced radially outwardly.

In a further advantageous embodiment of the invention, the at least two teeth in each case protrude from one respective tooth root over a length of a tooth height to one respective tooth tip, radially from the lateral surface, wherein the respective open recess and/or the respective thermally conductive element extend in the radial direction toward the respective tooth tip, in each case at least as far as the surface of the electrical winding which is located in the respective winding groove and which faces a radial opening of the respective winding groove.

Such a radial dimension of the respective open recess, in particular the respective first open recess and/or the respective thermally conductive element, permits an effective discharge of the heat received by, in particular, the electrical winding toward the lateral surface. While the respective second open recess is designed to be open toward the lateral surface in the radial direction, such a radial dimension of the respective thermally conductive element arranged in the respective second open recess produces a good discharge of heat from the interior of the respective tooth.

The respective first open recess and the respective thermally conductive element may, for example, have approximately the same radial dimension toward the respective tooth tip. In particular, when the respective open recess is designed as the above-described first open recess, the respective first open recess and the respective thermally conductive element extend in the radial direction preferably along at least one portion of the aforementioned side of the respective tooth which faces the respective slot wedge. Alternatively or additionally, the respective first open recess may be designed such that it covers at least partially the respective electrical winding on its surface facing the radial opening of the respective winding groove.

In a further advantageous embodiment of the invention, the thermally conductive material comprises copper or aluminum.

Copper has the advantage that it is used in any case during the production of electric machines and also has a good thermal conductivity. Moreover, copper and aluminum are able to be processed easily so that the production of a good thermal contact between the respective thermally conductive element, on the one hand, and the magnetically permeable material and/or the electrical winding, on the other hand, is able to be made without great cost.

In a further advantageous embodiment of the invention, the respective thermally conductive element is connected by a positive or material connection to the respective tooth.

The positive connection may be achieved, for example, in that the respective open recess tapers toward its respective opening and the respective thermally conductive element, for example, is pressed in the radial direction and/or in the peripheral direction or is pushed in the axial direction into the respective open recess. It is conceivable, in particular, in the above-described respective second open recess to provide a closure stopper, the positive connection and a radial fixing of the respective thermally conductive element toward the lateral surface being achieved thereby. A material connection may be achieved, for example, by means of hot isostatic pressing (HIP). By the positive and/or material connection in each case an effective thermal transfer to the respective thermally conductive element is ensured.

In a further advantageous embodiment of the invention, the respective thermally conductive element is connected to the respective tooth by means of an adhesive.

By means of the adhesive almost any geometric shape of the respective thermally conductive element and/or the respective open recess is permitted, wherein the respective thermally conductive element, however, is reliably held on and/or in the tooth. Preferably, the adhesive has a relatively high thermal conductivity so that an effective heat transfer to the respective thermally conductive element is ensured. For example, the adhesive may be designed as a type of thermally conductive adhesive paste.

In a further advantageous embodiment of the invention, the thermal conductivity of the thermally conductive material is at least five times as great, preferably at least eight times as great, as the thermal conductivity of the magnetically permeable material.

Such materials ensure a particularly effective discharge of the waste heat produced during operation of the respective active part. In particular when the active part is designed to be solid and made from steel, in particular chrome molybdenum steel, the thermally conductive material may be selected, for example, as copper or aluminum.

BRIEF DESCRIPTION OF THE DRAWING

The invention is described and explained hereinafter with reference to the exemplary embodiments shown in the figures, in which:

FIG. 1 shows a first exemplary embodiment of the active part according to the invention,
FIG. 2 shows a second exemplary embodiment
FIG. 3 shows a third exemplary embodiment,
FIG. 4 shows a fourth exemplary embodiment, and
FIG. 5 shows a fifth exemplary embodiment.

DETAILED DESCRIPTION OF PREFERRED EMBODIMENTS

FIG. 1 shows a first exemplary embodiment of the active part according to the invention, wherein a detail of a cross section is shown perpendicular to an axis of rotation 5 of the active part.

The active part has a lateral surface 3 from which two teeth 1 protrude outwardly in the radial direction 2. The two teeth 1 in each case have a magnetically permeable material, wherein a winding groove 4 is arranged between the two teeth 1, said winding groove 4 being arranged along the axis of rotation 5 of the active part. An electrical winding 6 is arranged in the winding groove 4.

For improving the cooling of the active part the respective tooth 1 has a first open recess 10 which is arranged on one respective tooth flank 7. The respective tooth flank 7 in this case faces the winding groove 4, wherein the respective first open recess 10 is arranged in a plane which is spanned by a substantially radial direction 2 and a direction substantially along the axis of rotation 5. A thermally conductive element 11 which has a thermally conductive material is arranged in the respective first open recess 10, the thermal conductivity thereof being greater than that of, the magnetically permeable material. The respective first thermally conductive element 11 may be connected, for example, to the respective tooth 1 by means of an adhesive or by means of a positive connection.

The respective tooth 1 extends in the radial direction 2 proceeding from the lateral surface 3 along a tooth height 13 from a tooth root 12 to a tooth tip 14. The respective first open recess 10 and/or the respective thermally conductive element 11 extends in the radial direction 2, preferably toward the respective tooth root 12, to a depth 15 which corresponds at most to 9/10, in particular to 4/5 of the tooth height 13. The depth 15 is measured in this case in the radial direction 2 starting from the tooth tip 14. Moreover, the respective first open recess 10 extends and/or the respective thermally conductive element 11 extends in the radial direction toward the respective tooth tip 14, preferably at least as far as the surface 8 of the electrical winding 6 which faces a radial opening of the respective winding groove 4.

In particular, the active part has more than two teeth 1 so that a plurality of winding grooves 4 are present. In this case, the respective tooth flank 7 facing a winding groove 4 is preferably designed as set forth above, so that in each case a first open recess 10 and a thermally conductive element 11 arranged therein are provided. The respective tooth 1 is thus preferably of symmetrical design in the peripheral direction.

FIG. 2 shows a second exemplary embodiment of the active part according to the invention. The same reference numerals as in FIG. 1 in this case denote the same objects. Since the active part of the second exemplary embodiment has some similarities with that of the first exemplary embodiment, only a few differences are described.

The respective tooth 1 of the active part according to the second exemplary embodiment faces along the electrical winding 6 and, moreover, has a dimension in the peripheral direction increasing from radially inwardly to radially outwardly. For example, the respective tooth 1 may be designed such that the winding groove 4 has parallel flanks. The respective first open recess 10 extends in the radial direction toward the respective tooth tip 14 beyond the electrical winding 6. This permits the respective thermally conductive element 11 arranged in the respective first open recess 10 to be additionally continued to the surface 8 of the electrical winding 6 which faces the radial opening of the winding groove 4. The respective thermally conductive element 11 is thus partially arranged in the radial direction 2 adjoining the surface 8.

FIG. 3 shows a third exemplary embodiment of the active part according to the invention. Since the active part of the third exemplary embodiment has some similarities with that of the first exemplary embodiment, only a few differences are described.

The respective tooth 1 of the active part according to the third exemplary embodiment faces along the electrical winding 6 and, moreover, has a dimension in the peripheral direction increasing radially inwardly to radially outwardly. For example, the respective tooth 1 may be designed such that the winding groove 4 has parallel flanks. The winding groove 4 is closed in the radial direction by means of a slot wedge 9, which is arranged further radially outwardly relative to the electrical winding 6. The two teeth 1 and the slot wedge 9 in this case are designed such that, at least in the radial direction 2, a positive connection is present which fixes the slot wedge 9 and thus also the electrical winding 6 radially outwardly. Additionally, the respective thermally conductive element 11 may also be fixed by means of the slot wedge 9.

The respective first open recess 10 extends in the radial direction toward the respective tooth tip 14 beyond the electrical winding 6 along a part of the side of the respective tooth 1 facing the slot wedge 9. Also the respective thermally conductive element 11 arranged in the respective first open recess 10 extends toward the respective tooth tip 14 beyond the electrical winding 6 along a part of the side of the respective tooth 1 facing the slot wedge 9.

Additionally, the respective thermally conductive element 11 may be designed such that the respective thermally conductive element 11, as in the second exemplary embodiment, is additionally continued to the surface 8 of the electrical winding 6 which faces the radial opening of the winding groove 4. The respective thermally conductive element 11 may therefore be arranged partially in the radial direction 2 adjacent to the surface 8. Thus a portion of the respective thermally conductive element 11 may be arranged between the electrical winding 6 and the slot wedge 9.

It is also conceivable that a slot wedge 9 is not provided and the respective first open recess 10 and/or the respective thermally conductive element 11 extend in the radial direction toward the respective tooth tip 14 but beyond the electrical winding 6.

FIG. 4 shows a fourth exemplary embodiment of the active part according to the invention.

The active part has a lateral surface 3, two teeth 1 protruding outwardly therefrom in the radial direction 2. The two teeth 1 in each case have a magnetically permeable material, wherein a winding groove 4 is arranged between the two teeth 1, said winding groove being arranged along an axis of rotation 5 of the active part. An electrical winding 6 is arranged in the winding groove 4.

For improving the cooling of the active part, the respective tooth 1 has a second open recess 20 which is incorporated as a groove from the radial outward direction in the respective tooth 1. The respective second open recess 20 is thus arranged in a plane which is spanned by a substantially radial direction 2 and a direction substantially along the axis of rotation 5. A thermally conductive element 21 is arranged in the respective second open recess 20, said thermally conductive element having a thermally conductive material, the thermal conductivity thereof being greater than that of the magnetically permeable material. The respective second thermally conductive element 21 may be connected, for example, by means of an adhesive or by means of a positive connection to the respective tooth 1.

The respective second open recess 20 and/or the respective thermally conductive element 21 extends in the radial direction 2 preferably toward the respective tooth root 12 to a depth 15 which corresponds at most to 9/10, in particular to 4/5 of the tooth height 13. The depth 15 in this case is measured in the radial direction 2 proceeding from the tooth tip 14.

Moreover, the respective thermally conductive element 21 extends in the radial direction 2 toward the respective tooth tip 14, preferably at least as far as the surface 8 of the electrical winding 6 which faces a radial opening of the respective winding groove 4.

The winding groove 4 in the radial direction 2 is closed by means of a slot wedge 9 which is arranged further radially outwardly relative to the electrical winding 6. The two teeth 1 and the slot wedge 9 in this case are designed such that at least in the radial direction 2 a positive connection is present which radially outwardly fixes the slot wedge 9 and thus also the electrical winding 6. Similarly, a closure stopper 16 is provided for the respective second open recess 20 and the respective thermally conductive element located therein 21, said closure stopper in particular serving to fix the respective thermally conductive element 21 by means of a positive connection in the radial direction 2.

In particular, the active part has more than two teeth 1, so that a plurality of winding grooves 4 are present. In this case, the respective tooth flank 7 facing a winding groove 4 is preferably designed as described above, so that in each case a first open recess 10 and a thermally conductive element 11 arranged therein are provided. The respective tooth 1 is thus preferably designed symmetrically in the peripheral direction.

FIG. 5 shows a fifth exemplary embodiment of the active part according to the invention. Since the active part of the fifth exemplary embodiment has some similarities with that of the fourth exemplary embodiment, only a few differences are described.

The respective second open recess 30, according to the active part of the fifth exemplary embodiment, is designed as a bore, which in each case is incorporated in the radial direction into the respective tooth 1. One respective thermally conductive element 30 and a closure stopper 16 are arranged in the respective second open recess 30, said thermally conductive element and/or said closure stopper being designed to fit the respective bore.

In summary, the invention relates to an active part of an electric machine, wherein the active part has at least two teeth which in each case have a magnetically permeable material and which in each case protrude in the radial direction from a lateral surface of the active part, and comprises at least one winding groove, which in each case is arranged between a pair of at least two teeth, wherein the at least one winding groove is arranged substantially along an axis of rotation of the active part and wherein an electrical winding is able to be arranged in the respective winding groove. The invention further relates to an electric machine comprising such an active part. In order to improve the cooling of an active part in a cost-effective manner, it is proposed that the active part has at least one open recess which in each case is arranged on or in one respective tooth in one respective plane, wherein the respective plane is spanned by a substantially radial direction and a direction substantially along the axis of rotation, and has at least one thermally conductive element which is arranged at least partially in the respective open recess and which has a thermally conductive material, the thermal conductivity thereof being greater than that of the magnetically permeable material.

What is claimed is:

1. An active part of an electric machine, said active part comprising:
   at least two teeth, each having a magnetically permeable material and protruding from a lateral surface of the active part in a radial direction, each of the at least two teeth having an open recess in a plane spanned by a substantially radial direction and a direction substantially along an axis of rotation;
   a winding groove arranged between the at least two teeth substantially along an axis of rotation of the active part;
   an electrical winding configured for arrangement in the winding groove; and
   a thermally conductive element arranged at least partially in the open recess and having a thermally conductive material defined by a thermal conductivity which is greater than a thermal conductivity of the magnetically permeable material.

2. The active part of claim 1, wherein each said tooth, when viewed in a peripheral direction, has a tooth flank which faces the winding groove, with the open recess being arranged at least partially on the tooth flank.

3. The active part of claim 1, wherein the electrical winding has a surface which faces a radial opening of the winding groove, said thermally conductive element being configured such that the thermally conductive element is arranged at least partially in the radial direction adjacent to the respective surface of the electrical winding facing the radial opening.

4. The active part of claim 1, further comprising a slot wedge configured to close the winding groove in the radial direction and thereby radially fix the electrical winding in the winding groove, at least one of the open recess and the thermally conductive element being at least partially arranged on a side of the tooth which side faces the slot wedge.

5. The active part of claim 1, wherein the open recess is configured as a groove or a bore which is incorporated into the tooth in the radial direction.

6. The active part of claim 1, further comprising a closure stopper configured to close the open recess.

7. The active part of claim 1, wherein the active part represents a solid rotor of the electric machine.

8. The active part of claim 1, wherein each of the at least two teeth is configured to protrude radially outwardly from the lateral surface and dimensioned at least along the electrical winding to increase in a peripheral direction from radially inwardly to radially outwardly.

9. The active part of claim 1, wherein each of the at least two teeth is configured to protrude radially from the lateral surface from a tooth root over a length of a tooth height to a tooth tip, at least one of the open recess and the thermally conductive element extending in the radial direction toward the tooth root up to a depth in the tooth, which depth corresponds at most to $9/10$.

10. The active part of claim 9, wherein the depth is at most $4/5$ of the tooth height.

11. The active part of claim 3, wherein each of the at least two teeth is configured to protrude radially from the lateral surface from a tooth root over a length of a tooth height to a tooth tip, at least one of the open recess and the thermally conductive element extending in the radial direction toward the tooth tip at least up to the surface of the electrical winding in the winding groove.

12. The active part of claim 1, wherein the thermally conductive material comprises copper or aluminum.

13. The active part of claim 1, wherein the thermally conductive element is connected by formfit or material connection to the tooth.

14. The active part of claim 1, wherein the thermally conductive element is connected to the tooth by an adhesive.

15. The active part of claim 1, wherein the thermal conductivity of the thermally conductive material is at least five times as great as the thermal conductivity of the magnetically permeable material.

16. The active part of claim 1, wherein the thermal conductivity of the thermally conductive material is at least eight times as great as the thermal conductivity of the magnetically permeable material.

17. An electric machine, comprising an active part which includes at least two teeth, each having a magnetically permeable material and protruding from a lateral surface of the active part in a radial direction, each of the at least two teeth having an open recess in a plane spanned by a substantially radial direction and a direction substantially along the axis of rotation, a winding groove arranged between the at least two teeth substantially along an axis of rotation of the active part, an electrical winding configured for arrangement in the winding groove, and a thermally conductive element arranged at least partially in the open recess and having a thermally conductive material defined by a thermal conductivity which is greater than a thermal conductivity of the magnetically permeable material.

* * * * *